United States Patent [19]

Schmidt

[11] Patent Number: 4,964,451
[45] Date of Patent: Oct. 23, 1990

[54] PNEUMATIC TIRE

[76] Inventor: Oskar Schmidt, Freyung 4, 1010 Vienna, Austria

[21] Appl. No.: 278,680

[22] Filed: Dec. 1, 1988

[30] Foreign Application Priority Data

Dec. 2, 1987 [AT] Austria .................................. 3177/87

[51] Int. Cl.⁵ ............................ B60C 7/22; B60C 5/00
[52] U.S. Cl. ................................. 152/202; 152/156; 152/259; 152/286
[58] Field of Search ............... 152/156, 202, 210, 211, 152/247–252, 258, 259, 276, 285, 284, 286

[56] References Cited

U.S. PATENT DOCUMENTS

| 762,740 | 6/1904 | Midgley | 152/202 |
| 1,021,171 | 3/1912 | Ward | 152/202 |
| 1,058,433 | 4/1913 | Huckstep | 152/202 |
| 1,133,153 | 3/1915 | Jones | 152/202 |
| 1,472,913 | 11/1923 | Jones | 152/202 |
| 2,059,764 | 11/1936 | Zerillo | 152/202 |
| 2,201,113 | 5/1940 | Neal | 152/211 |
| 3,449,199 | 6/1969 | Mead | 152/210 |
| 3,608,605 | 9/1971 | Cole | 152/361 |
| 3,830,272 | 8/1974 | Monzini | 152/201 |

FOREIGN PATENT DOCUMENTS

| 0008202 | 4/1894 | United Kingdom | 152/202 |
| 0102296 | of 1916 | United Kingdom | 152/202 |

Primary Examiner—Michael W. Ball
Assistant Examiner—Gregory J. Wilber
Attorney, Agent, or Firm—Herbert Dubno

[57] ABSTRACT

A pneumatic tire of the belted type has a radial reinforcement in the side walls and tread portions of the body, anchored to the bead rings thereof and in the flattened tread portion a circumferential belt formed by flattened helical links looped or interlaced together and having their axes transverse to the circumferential direction is disposed in the flattened tread portion between the radial reinforcement and the outer surface.

7 Claims, 2 Drawing Sheets

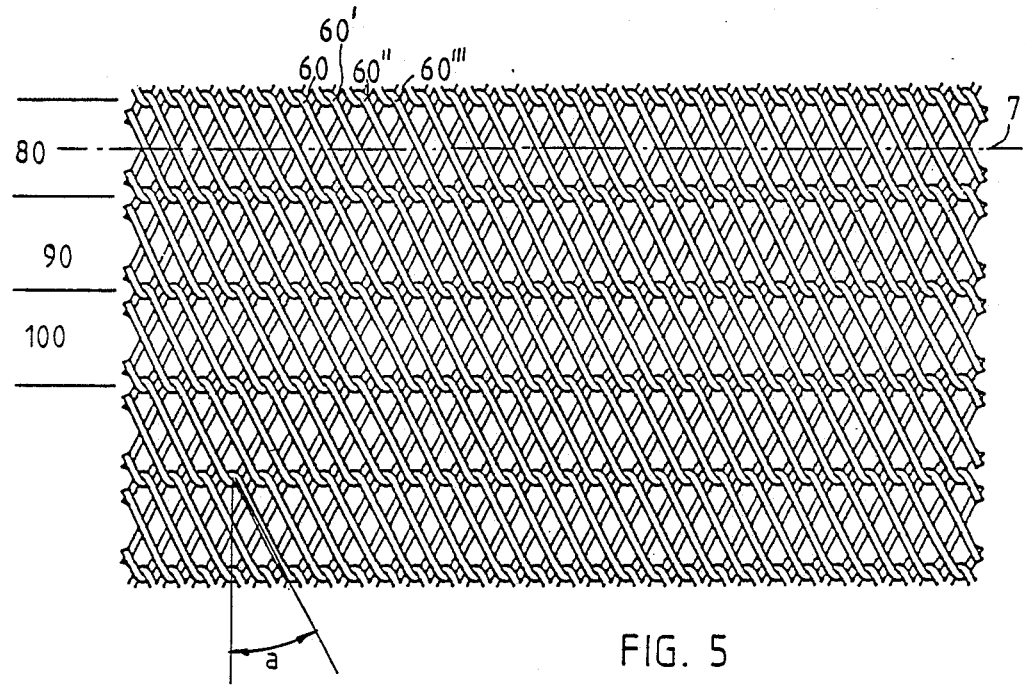
FIG. 5
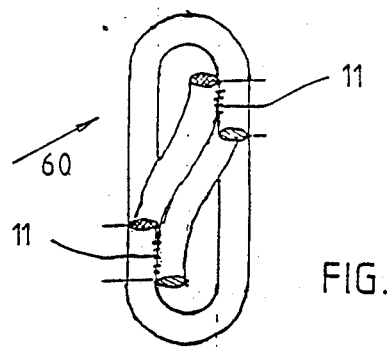
FIG. 6
FIG. 7
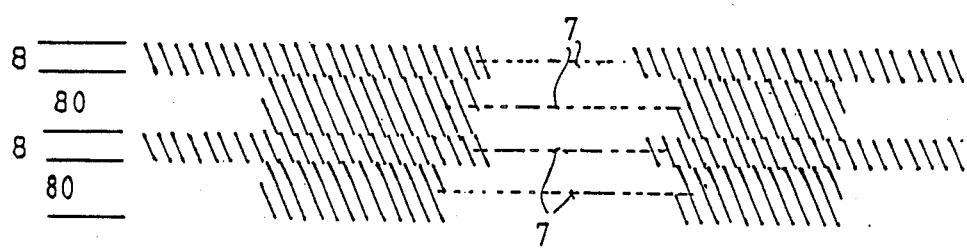

PNEUMATIC TIRE

FIELD OF THE INVENTION

The invention refers to a vehicle tire with an elastomeric tire body containing reinforcing equipment provided with a tread and a belt with interlocking links which lies beneath the tread.

BACKGROUND OF THE INVENTION

Vehicle tire belts bear the tensile strain acting on the tire body. The usual types of belts are made of cords, especially steel cords, which are positioned at an angle of about 0° to 30° to the longitudinal axis of the tire. The rigidity of the traditional belt constructions has an adverse effect on the rolling resistance of the vehicle wheels.

When the tire pass over the surface of the ground, the part of the tire in contact with the ground is somewhat squeezed, and thus the perimeter of the tire is reduced. As the belt is set in this same direction, it is compressed, and this again leads to an undulated deformation of the sides of the tire and thus to undue strain.

OBJECT OF THE INVENTION

It is the object of this invention to create a tire of the type described above, yet without any of the disadvantages mentioned, i.e. without any additional strain put on the tire sides and with considerably decreased rolling resistance.

SUMMARY OF THE INVENTION

This object is thus achieved: the belt is made up of oblong wire helixes set transversally to the tire perimeter and connected longitudinally in the style of hinge.

In the case of a vehicle tire according to the invention, the kind of compression mentioned above is not possible any more because the individual wire helixes have some leeway in their interdependent motion. The belt according to the invention can be easily and very accurately manufactured by conventional machines. This type of tire construction is also particularly well suited for efficient prefabrication. Neither is it difficult to intergrate the tire construction with the mold used in tire manufacturing.

In order to minimise the distance between the individual wires with the lead of the helixes selected, it is advisable, in the case of the invention, to have multiple-thread links. Thus it is possible to have various types of multiple-thread links connected alternately to each other. In this way, the belt can consist of alternating links of varying width. The lead (leading angle or pitch angle) of the wire helixes of links positioned side by side should be the same.

In order to achieve a closeness of the links necessitated by the reduced perimeter in the area between the tire sides and the tread (the area of increased compression), it is advantageous, according to another feature of the invention, for links positioned side by side to be of alternately varying length, the shorter links extending only over the tread area of the tire. It is advantageous for the shorter links to be more multiple-treaded than the longer ones.

BRIEF DESCRIPTION OF THE DRAWING

In the following, the invention is described in more detail by means of various examples of operation.

FIG. 5 is a top view similar to FIG. 2 of a belt made of quadruple-thread links;

FIG. 6 is a side-view similar to FIG. 4 (but on an enlarged scale); and

FIG. 7 is a diagrammatic representation of a belt consisting of varying multiple-thread links of equally varying length.

SPECIFIC DESCRIPTION

Figure 1:
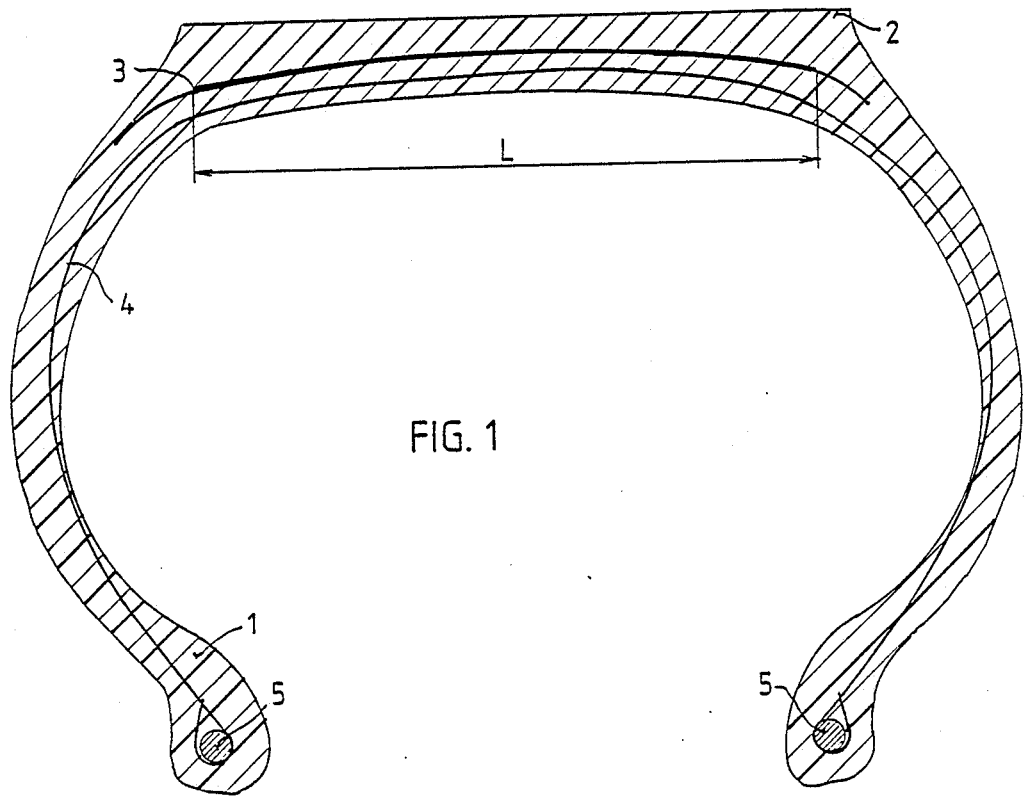
FIG. 1 shows a cross-section of a tire with a belt according to the invention.

The vehicle tire shown in FIG. 1 has a tire body 1 with a tread 2. Within the tread 2, there is a belt 3; the radial reinforcement 4, fastened by means of rings 5 in the beads of the sidewall is set in transverse to the belt.

Figure 2:
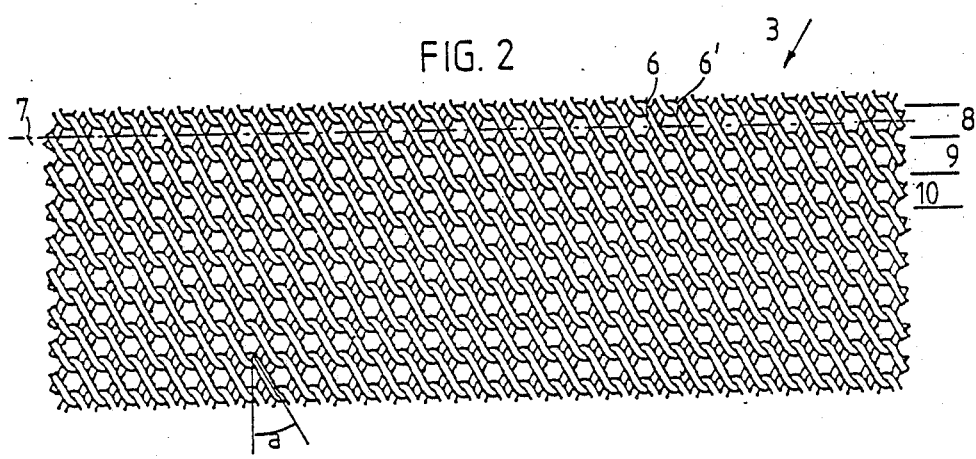
FIG. 2 is a top view of a portion of such a belt consisting of wire helixes.
Figure 3:
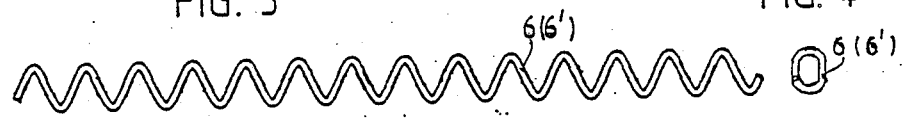
FIGS. 3 and 4 show views of one individual wire helix from two directions at right angles to each other.
Figure 4:
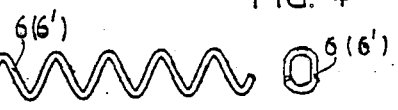

According to FIG. 2, the belt 3 is made up of links consisting of wire helixes 6, 6' which are connected one to another. FIGS. 3 and 4 show such a spiral wire helix.

The longitudinal axes 7 of the spiral wire helixes 6 and 6' run transversally to the tire perimeter. The connection of the wire helixes 6 and 6', respectively, creates links 8, 9, 10 etc, positioned side by side, connected to each other longitudinally and extending over the width of the tire. The embodiment according to FIG. 2 shows the individual links as bi-thread. Thus, each link is formed by one wire helix 6 and one wire helix 6'.

The embodiment according to FIG. 5, on the other hand, shows each of the links 80, 90, and 100 formed by four wire helixes 60, 60', 60" and 6"'; thus, each link is quadruple-thread.

A comparison of FIGS. 2 and 5 shows that the lead angle "a" is the same in both embodiments of the belt. Thus, it is also possible to connect different multiple-thread links, as indicated in FIG. 7, which shows each link 8 connected to one link 80 so that the belt unity is made up of links of varying width set side by side.

The quadruple-thread links 80 are also shorter than the bi-thread links 8, since the links 80 are meant to extend only over the thread width L (FIG. 1), while the bi-thread links 8 extend into the chamber area of the tire. Thus, the links 8 can move towards each other, whenever the tire perimeter is reduced.

FIG. 6 shows a side-view of wire helix 60. It is made clear that the wire helix 60 has a somewhat ellipsoid or oval cross-section. As indicated at 11, both wire ends can be welded, soldered or glued to the adjacent portion of the wire. However, it is not absolutely necessary to do this, as the connection with the adjacent wire helix and the tire material (by subsequent molding) normally will ensure that the wire ends will stay in position.

Within the scope of this invention, numerous alterations are possible. Thus, for instance, it is hardly necessary to use only bi-thread or quadruple-thread spiral wire helixes. It will rather depend on the necessary lead angle and distance between the individual wires, respectively, which type of multiple-thread helix should be employed, Furthermore, the cross-section of the individual wire elements might be circular instead of oval, while the same lead is maintained. Such a type of application would be especially advantageous for non-multiple-thread links. Moreover, it is possible to place several bands or layers of wire helixes one above the other or also to combine one or more wire helix layers with a convention cord belt.

I claim:

1. A belted vehicle tire comprising:
   an elastomeric body provided with:
   a tread portion formed with a flattened outer circumference and a generally flattened inner circumference spaced from said outer circumference, and
   a pair of spaced apart curved side walls connected to said tread portion and each having a respective radial inner surface merging with said inner circumference of said tread portion, and terminating remote from said tread at a bead;
   a radial reinforcement extending continuously through said tread portion and said side walls of said body and being spaced from said inner circumference of said tread portion;
   means for fastening said radial reinforcement at said bead; and
   a belt extending generally parallel to said flattened outer circumference endlessly along the entire tread portion through said tread portion of said elastomeric body, said belt being located between said radial reinforcement and said outer flattened circumference of said tread portion, said belt being formed by a plurality of links positioned side by side and each link formed by at least one helical wire having mutually parallel axes extending transversely to a circumferential direction of said elastomeric body, each of said helical wires having flattened turns with opposite bends, each of said links being directly looped at said bends to respective bends of the adjacent links.

2. The tire defined in claim 1 wherein adjacent ones of said links are of different widths.

3. The tire defined in claim 1 wherein each of said links is formed with the same leading angle.

4. The tire defined in claim 1 wherein each of said links is formed with a plurality of said helical wires.

5. The tire defined in claim 4 wherein adjacent ones of said links are of different alternating widths.

6. The tire defined in claim 5 wherein at least one of said links are formed by two helical wires.

7. The tire defined in claim 5 wherein at least one of said links are formed by four helical wires.

* * * * *